J. H. THOMPSON.
PILOT FOR CATERPILLAR TYPE TRACTORS.
APPLICATION FILED AUG. 20, 1919.
1,331,403.
Patented Feb. 17, 1920.
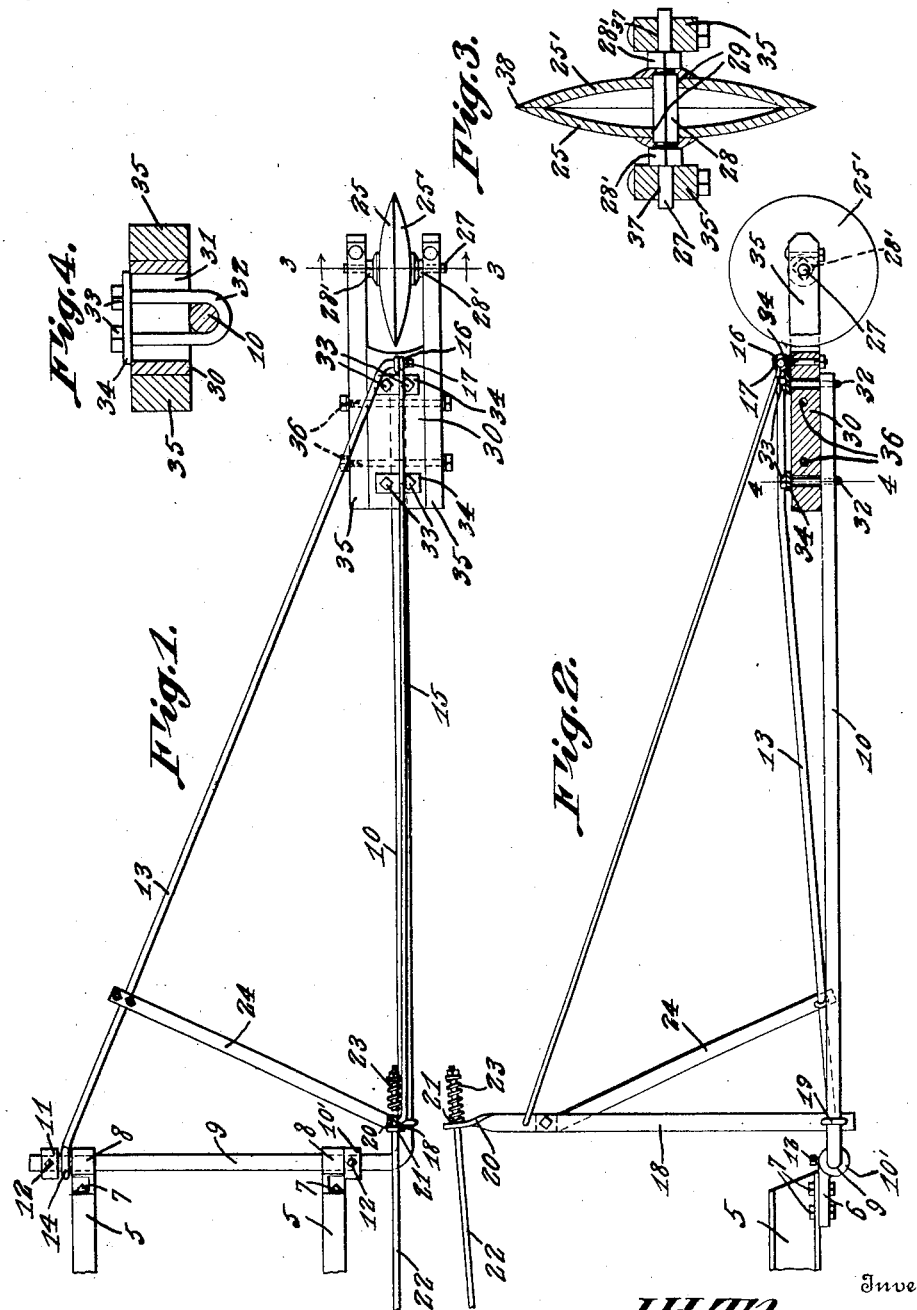
Inventor
J. H. Thompson,
By C. A. Snow & Co.
Attorneys
Witness
Q. E. Simpson

UNITED STATES PATENT OFFICE.

JAMES H. THOMPSON, OF HARRISONVILLE, MISSOURI.

PILOT FOR CATERPILLAR-TYPE TRACTORS.

1,331,403.   Specification of Letters Patent.   Patented Feb. 17, 1920.

Application filed August 20, 1919. Serial No. 318,755.

*To all whom it may concern:*

Be it known that I, JAMES H. THOMPSON, a citizen of the United States, residing at Harrisonville, in the county of Cass and State of Missouri, have invented a new and useful Pilot for Caterpillar-Type Tractors, of which the following is a specification.

This invention relates to improvements in agricultural machinery, and more particularly to guiding mechanisms for caterpillar tractors.

The primary object of the invention is to provide means to be attached to a tractor, for automatically guiding the same, thereby holding the tractor, and plow, associated therewith, in proper relation to a furrow, or predetermined lines.

A further object of the invention is to provide an especially constructed guiding element having means for engaging the side walls of a furrow, for accomplishing the guiding result, the guiding element also being provided with means for holding the means engaging the side walls of the furrow into close engagement therewith, thereby insuring the tractor following a true line over the field being plowed.

A further object of the invention is to provide a guide of this character, having means to permit the same to be adjusted with relation to its support, whereby the angle at which the guide operates, may be changed to efficiently operate in furrows of various widths and sizes.

A still further object of the invention is to provide means for shifting the guiding mechanism, and its support laterally, to permit the tractor to operate at various positions with relation to the wall of the previously formed furrow.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a plan view of a guide and its support, constructed in accordance with the present invention.

Fig. 2 illustrates a side elevational view of the same, showing the guiding head in cross section.

Fig. 3 illustrates a sectional view taken on line 3—3 of Fig. 1, and

Fig. 4 illustrates a sectional view taken on line 4—4 of Fig. 2.

Referring to the drawing in detail, the reference character 5 designates the front ends of the side bars of the frame of a tractor, not shown, and to these front ends 5, are secured the brackets 6, bolted to said bars as at 7.

Each of the brackets 6, includes the bearing 8, through which extends the right angled end 9 of the relatively long bar 10, forming a part of the support.

This end 9, is provided with collars 10 and 11, which collars, are also provided with threaded openings to receive the set screws 12, whereby the collars may be adjusted along the end 9, to enable the support proper, to be moved with relation to the side bars of the tractor. This support also includes the relatively long bar 13, which is disposed at an angle with relation to the bar 10, the same being provided with the eye 14 formed at one end thereof. The opposite end of said bar 13 extends at an angle and has connection with the rod 15, as at 16. The right angled end of the bar 13, passes loosely through the eye bolt 16', mounted to move in the head, and said end is provided with an opening to receive a cotter pin 17, or similar securing means, to prevent displacement of the bar 13, with relation to the rod 15.

The vertically extending bar 18, has one of its ends rigidly connected to the bar 10 of the support, by means of the eye bolt 19, which embraces a portion of the bar 10, one end of said eye bolt passing through the bar 18, and being secured in such position, by a nut, or other suitable means, not shown.

The upper end of the bar 18, is slightly twisted, as at 20, and is apertured as at 21, to receive one end of the operating bar 22, the end of the operating bar 22, passing through said opening 21, being of a diameter to permit free movement of the rod through said opening 21, the coiled spring 23, secured to the extreme end of the operating rod 22, being for the purpose of restricting such movement of the operating rod 22, with relation to the bar 18.

Disposed in close relation with the bar 18, and the bar 13, is a brace bar 24, which has its ends connected to the respective bars 13 and 18, to support the bar 18 with relation to the bar 13, and prevent movement of one bar with relation to the other.

The pilot disk, forming an important feature of the present invention, is substantially heavy and includes the concavo-convex members 25 and 25', the same being secured together by means of the nuts 28', so that their concave surfaces are disposed toward each other, the opposed convex surfaces thereof being beveled, adjacent the peripheries thereof, thereby forming a knife-like cutting edge 38 for purposes to be hereinafter more fully described.

This pilot disk is supported by means of the shaft 27, passing centrally through the disk, said shaft 27 being provided with a squared portion 28, fitted in correspondingly shaped openings 29, formed in the disk 25, whereby movement of the disk 25, is transmitted to the shaft 27.

The pilot support includes the head 30, provided with transverse slots 31, formed adjacent opposite ends thereof, which slots accommodate the U bolts 32, which bolts embrace a portion of the bar 10, and it will be seen that when the nuts 33, which operate on the threaded upper ends of the U bolts 32, are moved to closely engage the plate 34, the bar 10, is securely held with relation to the head 30.

From the foregoing it is obvious that the head may be adjusted laterally, as well as rotatably, with relation to the bar 10, by loosening the nut 33, and moving the same in proper adjusted position, and finally tightening the nut 33 as before described.

Arms 35, are secured to the side faces of the head 30, by means of the transversely extending bolts 36, passing through registering openings, of the head 30, and arms 35, the forward ends of said arms 35 extend beyond the front edges of the head 30, and are provided with openings 37, forming bearings for the shaft 27.

In the operation of the device, the support, to which the pilot is secured, is bolted to the forward ends of a tractor frame. The tractor is now moved to its proper position at one edge of a field to be plowed, the pilot disk 25 being adjusted to operate in a vertical plane, with relation to the head 30, and in a line parallel with the sides of the tractor. The tractor is now moved along the field, with the result that a furrow is formed.

The head 30 of the pilot is now adjusted so that the convex surfaces thereof will properly engage the side walls of the furrow. In operation, it follows that the cutting edge 38, of the pilot 25 embeds itself within the base of the furrow, a predetermined distance, with the result that the side, or convex surfaces of the pilot 25 are held to the side walls of the furrow, and the pilot follows the general line of the furrow, causing the machine, and plow drawn thereby, to follow a direct line, in proper relation with the previously formed furrow, and thereby eliminating the necessity of applying lateral pressure to the pilot disk to accomplish the guiding result, as is necessary by similar devices now in use.

While I have described the invention as applied to a tractor of the caterpillar type, it is to be understood that the invention may be applied and efficiently employed in connection with wheeled tractors, the same being applied, after the steering wheels thereof have been locked in a predetermined position.

Having thus described the invention, what is claimed is:—

1. In combination with a tractor having brackets formed adjacent the front end thereof, a guiding mechanism including a support, a right angled arm forming a part of the support, means for adjusting said arm laterally within the brackets, means for securing the arm in such adjusted positions, a head disposed at one end of the support, and a pilot disk supported by the head.

2. In combination with a tractor, a guiding mechanism including a support, a head including arms, disposed at one end of the support, said arms having bearings formed adjacent the outer ends thereof, a pilot disk having a shaft, operating in the bearings, said head being provided with transversely extending slots, U bolts positioned within the slots, said U bolts adapted to embrace a portion of the support for securing the head to the support, and means on one end of each of the U bolts for securing the U bolts to the head.

3. In combination with a tractor, a guiding mechanism including a relatively long supporting arm, a head including spaced arms, said head having transversely extending slots, U-bolts embracing a portion of the supporting arm, said U-bolts being of a width less than the length of the transversely extending slots, to prevent movement of the U-bolts, within the slots, a plate having connection with each of the U-bolts and adapted to cover the respective slots for securing the U-bolts within the slots, and means on the tractor for supporting the supporting arm.

In testimony that I claim the foregoing as my own, I have hereto affixed my signature in the presence of two witnesses.

JAMES H. THOMPSON.

Witnesses:
 Ivy E. Simpson,
 J. R. Pattison.